3,359,307
PRODUCTION OF PURIFIED SALICYLIC ACID
Noland Poffenberger and Donald F. Pontz, Midland, Mich., assignors to The Dow Chemical Company, Midland, Mich., a corporation of Delaware
No Drawing. Filed Mar. 10, 1965, Ser. No. 438,752
6 Claims. (Cl. 260—521)

This invention relates to an improved method for purifying salicylic acid by crystallizing it from its solution in an aqueous phenol solvent. It relates particularly to a process whereby salicylic acid of high purity is separated from a reaction mixture obtained by carbonating sodium phenoxide in phenol.

Salicylic acid is usually manufactured on a commercial scale by a process based on the Kolbe-Schmitt synthesis wherein dry sodium or potassium phenoxide is reacted with carbon dioxide under superatmospheric pressure at a temperature of about 90–180° C. One adaptation of this method is the Wacker process (Wacker, British 384,-619) in which the carbonation reaction is carried out with the alkali metal phenoxide dispersed and at least partially dissolved in excess phenol. The reaction mixture produced by such a process consists essentially of alkali salicylate, phenol, and usually a little unreacted alkali phenoxide. Also present are small quantities of by-products and impurities such as the akali metal salts of p-hydroxybenzoic acid, 4-hydroxyisophthalic acid, other related compounds, traces of metals picked up from the apparatus, and so on. The salicylate product is present in this mixture largely as a finely divided solid which is very difficult to separate by filtration and wash free of phenol. Although the salicylic acid obtained by acidification of this salt is sufficiently pure for some purposes, it is necessary to resort to a recrystallization or a sublimation step in order to obtain a highly purified material suitable for use as a pharmaceutical product or intermediate for such a product. This additional process step is time consuming and expensive.

An improved separation and purification process has now been discovered which is particularly adapted to Wacker type reaction mixtures and whereby the difficult and uneconomical filtration and washing of the sodium salicylate from such mixtures is eliminated. Furthermore, the quality of the salicylic acid produced by this new process is comparable in most respects to the quality of sublimed material. It has been found that salicylic acid of high purity and of good color is obtained by cooling a homogeneous solvent solution of crude salicylic acid to a temperature where salicylic acid crystallizes from the solution when the solvent is a mixture consisting essentially of phenol and water in proportions such that the solvent exists in two distinct liquid phases, a phenol-rich phase and a water-rich phase, at the crystallizing temperature. The crystallized salicylic acid is easily filtered or otherwise separated and washed to obtain the purified product in good yield. This crystallization in the presence of the two-phase liquid system produces uniquely improved results in that both organic and inorganic impurities are efficiently separated from the crystallizing salicylic acid by the simultaneous contact with the phenol-rich and the water-rich layers.

This new process is basically dependent upon the solubility characteristics of the phenol-water system at various temperatures. The behavior of this system is illustrated by the following table where the composition of each layer is shown at various temperatures for phenol-water systems existing in two liquid phases.

| Temp., ° C. | Weight Percent Phenol | |
|---|---|---|
| | Phenol layer | Water layer |
| 10 | 74 | 8 |
| 20 | 72 | 8.5 |
| 30 | 70 | 9 |
| 40 | 66.5 | 10 |
| 50 | 62.5 | 12.5 |
| 60 | 55.5 | 18 |
| 65 | 49 | 23 |
| 68 | Homogeneous solution | |

In the application of this new process to the recovery of pure salicylic acid from a Wacker type reaction mixture, it has been found advantageous to employ the following stepwise procedure:

(1) Add to the reaction mixture an aqueous strong mineral acid such as hydrochloric or sulfuric acid in an amount such that the pH of the acidified mixture is substantially below pH 7, preferably pH 1–3, employing an acidification temperature and a concentration of acid such that the acidified mixture consists of an aqueous brine layer and a liquid phenol-salicylic acid layer with no significant separation of either inorganic salt or solid salicylic acid. A temperature of about 40–100° C. is suitable for this step.

(2) Separate the phenol-salicylic acid layer from the lower, essentially saturated brine layer.

(3) Adjust the phenol content of the phenol-salicylic acid layer to about 15–65%, preferably about 25–40% by weight. Since the carbonation reaction is usually run using about 4–8 moles of phenol per mole of alkali metal phenoxide, ordinarily phenol must be removed, conveniently by distillation under reduced pressure.

(4) Add sufficient water to the adjusted phenol layer to produce a mixture having a salicylic acid content of about 25–40% by weight. Adjust the temperature to 75–100° C., thereby obtaining a single phase, homogeneous solution.

(5) Cool the solution to 10–40° C., thereby causing crystallization of salicylic acid and separation of the mother liquor into two liquid layers, a phenol-rich phase and a water-rich phase.

(6) Separate the crystalline salicylic acid. This product can then be washed and dried by conventional procedures.

The salicylic acid obtained by this procedure is a white crystalline solid of better than 99.5% assay which contains at most only trace amounts of impurities such as related organic acids, inorganic salts, and metallic contaminants. A single stage crystallization by this method offers recoveries of 80–90% of the theoretical amount of salicylic acid. A second crop of salicylic acid can be obtained by removing phenol from the phenol-rich layer of the mother liquor and repeating the above procedure.

In acidifying a Wacker type process reaction mixture, about 1–1.2 equivalents of acid are preferably used per equivalent of sodium. It is desirable to use aqueous acid of about 15–25% concentration to minimize the size of the brine layer produced and still avoid precipitation of the solid sodium salt of the mineral acid. A small amount of phenol contained in the separated brine layer can be recovered by a suitable extraction or distillation procedure.

The quantity of water incorporated with a phenol-salicylic acid mixture as described above is that required to cause the formation of two liquid layers, each being in a significant proportion, when the ternary solution is cooled to the crystallizing temperature. Preferably, these two liquid layers are present as the mother liquor in the cooled mixture in a proportion one to the other of not more than about ten to one by weight. This condition is obtained when the phenol and water contents are such that the phenol represents about 15–60% by weight of these two components taken together. This amount of water represents 0.67 to 5.67 parts per part by weight of phenol. The essence of the present invention is the discovery that when an impure salicylic acid product is crystallized from such a mixed solvent, the phenol-rich liquid layer in the cooled system is an excellent solvent for the principal impurities in the salicylic acid which are largely organic impurities. The other impurities are largely dissolved by the second liquid layer, the water-rich phase. Since the phenol-rich layer is much the better solvent for salicylic acid, the magnitude of the recovery of salicylic acid obtainable from the crystallization depends upon the amount of this phase. Therefore, it is most advantageous to employ a system wherein the salicylic acid content is about 25–40% by weight of the whole as previously described and the phenol content is such that the weight of the phenol-rich layer in the final mother liquor is about 30–100% of the weight of the water-rich layer. This condition is obtained when the proportion of phenol in the system is about 25–40% by weight of the sum of the phenol and the water present, i.e., 1.5–3 parts of water are added per part of phenol.

A preferred mode of operation of the present process as applied to recovering salicylic acid from the reaction mixture obtained by carbonating sodium phenoxide in excess phenol includes acidifying the mixture at about 50–60° C. by adding about 10% excess of 15–25% aqueous hydrochloric or sulfuric acid, separating the phenol layer from the brine, distilling the separated phenol layer under reduced pressure until the residue contains about 30–35% by weight of phenol, adding to the residue about an equal weight of water based on the weight of the residue, and adjusting the temperature of the aqueous mixture to 75–100° C. to form a homogeneous solution. The solution is then cooled slowly to 25–35° C., whereupon crystalline salicylic acid separates and the mother liquor forms two liquid layers, an aqueous layer and a smaller phenol layer. The solid salicylic acid is separated by filtration or decantation and is washed and dried by conventional means to obtain the purified product in 80–90% recovery.

EXAMPLE 1

A dry solution of sodium phenoxide in phenol in a ratio of one mole of phenoxide to about 7.5 moles of phenol was prepared by reacting sodium hydroxide with excess phenol and distilling water of reaction and some phenol from the resulting solution. The anhydrous solution was then subjected to the action of carbon dioxide under superatmospheric pressure at 100–140° C. until more than 0.9 mole of carbon dioxide per mole of phenoxide had been reacted. The reaction mixture was acidified by adding hydrochloric acid in slight excess over the sodium present, whereupon the acidified mixture separated into two liquid phases, a brine layer and a phenol layer containing dissolved salicylic acid.

The brine layer was drawn off. Phenol was distilled under reduced pressure from a 1000 g. aliquot of the phenol layer until the residue was essentially a mixture of 46.5 g. of phenol and 99.5 g. of salicylic acid. The residue was cooled to 120° C. and 186 ml. of water was added slowly to obtain a clear amber solution at about 100° C. This solution was cooled to 25° C. while stirring to form a slurry of crystalline salicylic acid in a mother liquor consisting of two liquid phases, a phenol layer and a water layer. The salicylic acid crystals were filtered, washed, and dried to obtain 83.1% of the salicylic acid originally present in the aliquot as white crystals containing no detectable 4-hydroxyisophthalic acid and 0.06% of p-hydroxybenzoic acid. The color of this product was 5 Klett (measured as a 10% solution in glacial acetic acid).

EXAMPLE 2

Another 1000 g. aliquot of the phenol layer of Example 1 was distilled as before to obtain a distillation residue containing 28.7 g. of phenol and 99.3 g. of salicylic acid. To this was added 142 g. of the phenol-saturated aqueous forecut from the distillation (contained about 13 g. of phenol) and the temperature of the mixture was adjusted to about 100° C. At this temperature, the mixture was a slightly cloudy amber solution. This was cooled to 25° C. while stirring to obtain a slurry of crystalline salicylic acid in a two-phase mother liquor as in Example 1. The separated salicylic acid amounted to 84.8% of the theoretical. The analysis and color of the product were essentially the same as those of the product of Example 1.

The present process is adaptable to the purification of any crude salicylic acid, whatever its method of preparation. Example 3 illustrates the application of the process to a crude salicylic acid obtained by another carbonation process.

*Example 3*

Crude salicylic acid was obtained by carbonating solid powdered sodium phenoxide, dissolving the resulting sodium salicylate in water, neutralizing the solution with sulfuric acid, and washing and drying the filtered precipitated acid. This impure salicylic acid had a Klett color above 100 and contained 0.25% of 4-hydroxyisophthalic acid.

A mixture of 1500 lbs. of this salicylic acid, 2894 lbs. of water, and 841 lbs. of phenol was stirred and heated to 88° C. in a large kettle to form a clear homogeneous amber solution. Stirring was continued as the solution was cooled slowly to 35° C. Separation of crystalline salicylic acid began at about 70° C. The cooling rate was controlled so that the crystallization required about six hours. The final mixture was composed of crystalline salicylic acid and two liquid phases, a phenol-rich layer and an aqueous layer containing some dissolved phenol. The solid salicylic acid was separated by filtration, then was washed and dried to obtain 85% of the originally charged salicylic acid as pure white crystals, M.P. 159–160.5° C., assay 99.7%. This product contained a maximum of 0.02% of 4-hydroxyisophthalic acid. Its quality was comparable in most respects to that of salicylic acid sublimed from the same crude product.

We claim:

1. In a process for obtaining crystalline salicylic acid by cooling to a crystallizing temperature a solvent solution of salicylic acid, thereby causing separation of solid salicylic acid from said solution, the improvement wherein the solvent is a mixture consisting essentially of phenol and water in proportions such that said solvent exists in two distinct liquid phases at said crystallizing temperature.

2. The process of claim 1 wherein the salicylic acid solution contains about 25–40% by weight of salicylic acid.

3. The process of claim 2 wherein the solvent is a mixture of 25–40% by weight of phenol and 75–60% of water.

4. A process for purifying impure salicylic acid which comprises forming a homogeneous solution of said salicylic acid of 25–40 weight percent concentration in a solvent consisting essentially of 25–40% by weight of phenol and 75–60% of water at a temperature of 75–100° C., cooling said solution to 10–40° C., and separating solid salicylic acid from the cooled solution.

5. In a process for making salicylic acid wherein sodium phenoxide at least partially dissolved in excess phenol is reacted with carbon dioxide under superatmospheric pressure at a temperature of about 90–180° C., thereby forming a reaction mixture consisting essentially of sodium salicylate, sodium phenoxide, and phenol, the improvement wherein said mixture is acidified by the addition thereto of at least one equivalent of a strong mineral acid per equivalent of sodium, the temperature of the acidified mixture is adjusted to 40–100° C., thereby forming a brine layer and a liquid phenol layer, separating the phenol layer, adjusting the phenol content of said phenol layer to 15–65% by weight, adding to the adjusted phenol layer 0.67–5.67 parts by weight of water per part of phenol contained, adjusting the temperature of the aqueous mixture thereby obtained to 75–100° C., thereby forming a substantially homogeneous solution, cooling said solution to 10–40° C., and recovering solid salicylic acid from the cooled solution.

6. The process of claim 5 wherein the phenol content of the phenol layer is adjusted to 25–40% and 1.5–3 parts of water per part of phenol is added to the adjusted phenol layer.

References Cited
FOREIGN PATENTS 384,619 12/1932 Great Britain.
604,775 9/1960 Canada.

LORRAINE A. WEINBERGER, *Primary Examiner.*

S. WILLIAMS, *Assistant Examiner.*